July 8, 1924.
W. H. NOELTING
CASTER SOCKET
Filed March 26, 1923
1,500,840
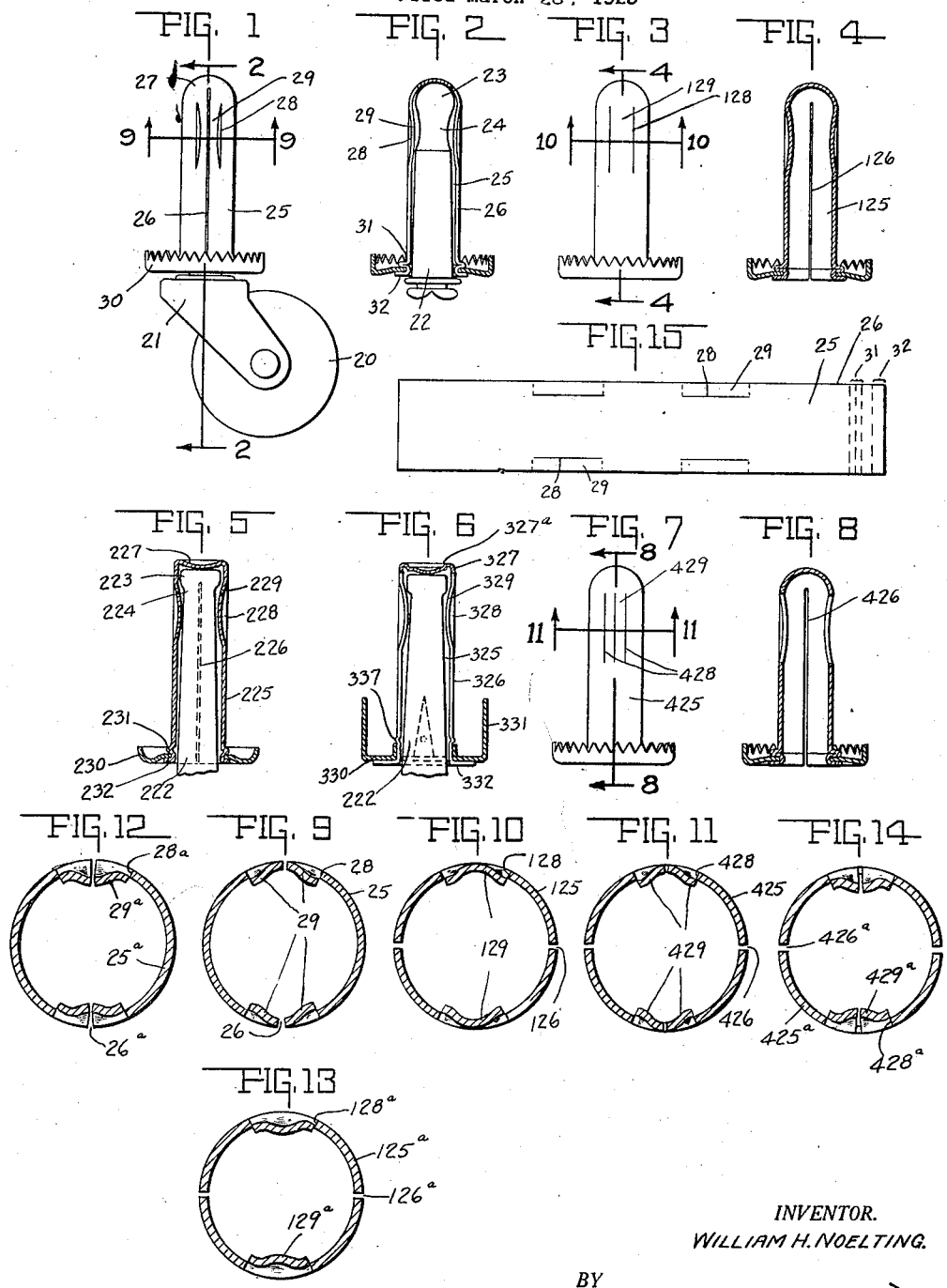
INVENTOR.
WILLIAM H. NOELTING.
BY
Lockwood Lockwood
ATTORNEYS.

Patented July 8, 1924.

1,500,840

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

CASTER SOCKET.

Application filed March 26, 1923. Serial No. 627,780.

*To all whom it may concern:*

Be it known that I, WILLIAM H. NOELTING, a citizen of the United States, and a resident of Evansville, county of Vanderburg, and State of Indiana, have invented a certain new and useful Caster Socket; and I do hereby declare that the following is a full, clear, and exact description thereof, reference being had to the accompanying drawings, in which like numerals refer to like parts.

This invention relates to a caster socket which is adapted to yieldingly retain a caster stem within the socket when the weight is removed from said stem and some forms of which are also adapted to limit the inward movement of the stem. Caster sockets of this general type are illustrated in the patents to D. F. Crean, et al., No. 454,257 and to B. H. Noelting, No. 626,439.

The chief object of this invention is to provide a caster socket of the character described with retaining means, which, first, will not materially weaken the socket particularly when subjected to a tensile stress, and second, which will not necessitate the use of a metal blank of irregular shape, thereby securing a socket of the character described with the two advantages of economical production and increased strength, while retaining all of the desirable features of said patented sockets.

The chief feature of the invention consists in longitudinally slitting a tubular stem enclosing body, so that a longitudinal retainer will be formed which is integral with the body at the upper and lower ends, thereby retaining the maximum strength to prevent separation when subjected to tensile stress.

Another feature of the invention is that the longitudinal and integral retainer extends inwardly from the tubular body, and preferably is curved and twisted in a transverse as well as a longitudinal plane.

The full nature of the invention will be understood from the accompanying drawings and the following description and claims.

In the drawings, Fig. 1 is an elevational view of a caster socket embodying features of the invention and a caster associated therewith. Fig. 2 is a sectional view taken on the line 2—2 of Fig. 1 showing said socket with the caster stem therein. Fig. 3 is an elevational view of a modified form of the invention. Fig. 4 is a sectional view thereof taken on the line 4—4 of Fig. 3 and in the direction of the arrows. Fig. 5 is a sectional view of another modified form of the invention with a different form of caster stem positioned therein. Fig. 6 is still a further modified form of the socket with the caster stem positioned therein. Fig. 7 is an elevational view of a modified form of socket which embodies the constructions shown in Figs. 1 and 3. Fig. 8 is a sectional view thereof taken on the line 8—8 of Fig. 7 and in the direction of the arrows. Fig. 9 is an enlarged transverse sectional view and is taken on the line 9—9 of Fig. 1 and in the direction of the arrows. Fig. 10 is a similar view taken on the line 10—10 of Fig. 3 and in the direction of the arrows. Fig. 11 is a similar view taken on the line 11—11 of Fig. 7 and in the direction of the arrows. Fig. 12 is a view similar to Fig. 9 but shows the longitudinal slitted portions having a reverse twist from that shown in Fig. 9. Fig. 13 is a view similar to Fig. 10 but shows the longitudinal slitted portions having a reverse twist from that shown in Fig. 10. Fig. 14 is a view similar to Fig. 11 but shows the longitudinal slitted portions having a reverse twist from that shown in Fig. 11. Fig. 15 is a developed plan view of a strip forming one form of tubular-socket.

In the drawings 20 indicates a caster wheel supported by the yoke 21, which yoke in turn supports a stem 22 having a head portion 23 and a reduced or neck portion 24. In Figs. 1 to 4 inclusive and in Figs. 7 and 8, the head portion preferably is spherical in curvature, or rounded.

Herein the modification shown in Figs. 1 and 2 is illustrated as including a tubular body portion 25 having a pair of meeting and longitudinal edges 26. A head portion 27 closes the end of the tubular body and prevents longitudinal movement of the stem 22 therethrough. Adjacent each longitudinal edge 26 near the head portion 27 is a longitudinal slit 28 which forms a longitudinal retainer 29, having its ends integral with the tubular body 25. As shown clearly in Fig. 2, the longitudinal retainer extends inwardly into the socket and is adapted to engage the reduced or neck portion 24 and yieldingly retain the stem in said socket, yet permit forcible insertion therein as well as forcible retraction therefrom. Preferably, see Fig. 9, the longitudinal retainers are curved and twisted in transverse section. Parallel sections taken from the junction of the longitudinal retainers to the plane of greatest indentation would show that the curvature and twist of the sections increases towards the plane of greatest indentation. Similarly, vertical sections would disclose curvatures of different radii with the greatest curvature and twist along the median line of the retainer, or if desired, and as shown in Fig. 2 when a plurality of adjacent retainers are provided, along the median plane of the entire retainer construction. It is to be understood that said retainer constructions and retaining members may be otherwise shaped; thus they may be angular instead of parabolic, or they may be arcuate instead of parabolic. However deformed, such deformation gives a permanent set in the nature of a twist to the longitudinal retainer or retainers which said reatiners will normally assume, but which will yield sufficiently to permit the passage of the caster stem head when forcibly inserted or retracted.

In Fig. 3 there is illustrated a modified form of the invention, and in this form of the invention the tubular body 125 is longitudinally slitted at 126, but herein the longitudinal retainer 129 formed by the longitudinal slits 128 is not positioned adjacent the longitudinal edge 126, but is positioned intermediate the same; and herein instead of providing a pair of complementary retainers to form a retaining construction, there is provided a pair of oppositely positioned retainers. These retainers may be shaped similar to the constructions shown in Figs. 1 and 2, or otherwise modified as suggested.

In Fig. 5 there is illustrated another modified form of the invention, and in this form of the invention the tubular body 225 is provided with the longitudinal slits 226 and the head portion 227. The head portion 227 is of convex curvature instead of concave curvature, as shown in Figs. 1 to 4 inclusive.

The tubular body is slitted at 228 intermediate the edges 226 to form the longitudinal retainers 229 integral at both ends with the body. Herein the stem 222 is shown provided with a head 223, and adjacent thereto is a usual neck portion 224 which herein is shown as a tapering construction. In this form of the invention there is supported by the tubular body a socket or plate 230, which is secured to said body by the parallel flanges 231 and 232. In this form of the invention the plate 230 is not provided with teeth or a serrated edge.

In Figs. 1 to 4 inclusive there is illustrated a track plate 30 having a serrated edge, and said plate is suitably secured between the flanges 31 and 32. The longitudinal retainer 229 in Fig. 5 is of the same character as that disclosed in Figs. 3 and 4. In Fig. 6 there is illustrated a modified form of the invention, and in this form of the invention the tubular body 325 has the longitudinal edges 326 and a head portion 327, which is provided with a flange 327$^a$. The construction of this head portion is substantially similar to that disclosed in the prior patent to William H. Noelting, No. 1,426,494, dated August 22, 1922. Likewise the caster stem 222 is similar to the caster stem disclosed in Fig. 5 and in said prior patent. In this form of the invention the body is longitudinally slotted at 328 adjacent to the longitudinal edges 326 to form the longitudinal retainers 329 integral with the body at the ends.

In this form of the invention there is illustrated a plate 330 which is provided with the upstanding teeth or prongs 331. The upstanding teeth 331 are elongated as shown. The plate 330 is connected to and supported by the socket 325 through the flange 332 and the brick punches or projecting points 331.

In Figs. 7 and 8 there is illustrated a further modified form of the invention, and in this form of the invention the tubular body portion 425 is longitudinally slotted at 426, and herein the body portion intermediate the longitudinal edges 426 is longitudinally slitted at 428 by a plurality of parallel slots to form a plurality of parallel longitudinal retainers 429. These longitudinal retainers are positioned as shown in Figs. 3 and 4 and are formed as shown in Figs. 1 and 2, with particular reference to Fig. 9. Fig. 11 illustrates such deformation.

In Figs. 12, 13 and 14 there are illustrated tubular sockets substantially similar to the sockets shown in Figs. 9, 10 and 11 respectively, with this exception that the longitudinal retainers are provided with a reverse twist from that shown in the aforesaid Figs. 9, 10 and 11.

The forcible injection and retraction of a caster stem having an enlarged head causes permanently twisted longitudinal retainers to yield to permit the passage of the head through the socket.

From the foregoing it will be understood that so far as the broad idea of the invention is concerned, the plate portion 30 and its various modifications and the method of supporting the same or securing the same to the lower end of the socket is relatively immaterial. Similarly, it will be noted that the particular shape of the head of the socket may be modified to suit the particular head of the stem retained by the socket. While in each of the modifications hereinbefore described, the socket is illustrated as formed from a longitudinal strip of metal, such as shown in Fig. 15, provided with a head portion intermediate its ends and with suitable longitudinal retainers between said head and said ends; such a metal blank strip is not necessarily the only shape by which these sockets or their equivalents can be formed.

The invention claimed is:

1. A caster stem socket comprising a tubular body portion longitudinally slitted to form an inwardly extending retainer integral at both ends with the body portion, said retainer having a twist imparted thereto.

2. A caster stem socket comprising a tubular body having a longitudinal edge, a longitudinally slitted portion adjacent said edge to form a retainer secured at both ends to the body and extending inwardly intermediate the anchoring ends and having a twist imparted thereto.

3. A caster stem socket comprising a tubular body having a pair of longitudinal edges adapted to lie adjacent each other, and longitudinally slitted portions adjacent each edge to form retainers secured at both ends to the body and extending inwardly for stem retaining purposes, said adjacent positioned retainers intermediate the anchoring ends having a twist imparted thereto.

4. A caster stem socket comprising a tubular body having a plurality of pairs of lonfinal adjacent edges, and longitudinally slitted portions adjacent each edge to form longitudinal retainers secured at both ends to the body and extending inwardly for retaining purposes.

5. A caster stem socket comprising a tubular body having a plurality of pairs of longitudinal adjacent edges, and longitudinally slitted portions adjacent each edge to form longitudinal retainers secured at both ends to the body and extending inwardly for retaining purposes, each longitudinal retainer having a twist imparted thereto.

6. A caster stem socket comprising a tubular body having a plurality of pairs of longitudinal adjacent edges, and longitudinally slitted portions adjacent each edge to form longitudinal retainers secured at both ends to the body and extending inwardly for retaining purposes, each longitudinal retainer having a twist imparted thereto, adjacent retainers being twisted complementarily.

7. A caster stem onepiece socket comprising a tubular body formed from a strip of sheet metal, the center of said strip forming a head portion integral with the socket, and the body having a slit adjacent each edge intermediate the center of the strip and the end thereof, said slitted portions forming adjacent longitudinal retainers secured at both ends to the body, said longitudinal retainers having a twist imparted thereto.

8. A caster stem onepiece socket comprising a tubular body formed from a strip of sheet metal, the center of said strip forming a head portion integral with the socket, and the body having a slit adjacent each edge intermediate the center of the strip and the end thereof, said slitted portions forming adjacent longitudinal retainers secured at both ends to the body, said longitudinal retainers having a twist imparted thereto, said longitudinal retainers extending less than half the distance between the top and bottom of the socket.

In witness whereof, I have hereunto affixed my signature.

WILLIAM H. NOELTING.